United States Patent [19]

McFarland

[11] Patent Number: 4,797,042

[45] Date of Patent: Jan. 10, 1989

[54] WHEELCHAIR LOADING APPARATUS

[76] Inventor: Robert E. McFarland, 8301 Northwest 39th Expressway, Bethany, Okla. 73008

[21] Appl. No.: 57,101

[22] Filed: Jun. 1, 1987

Related U.S. Application Data

[62] Division of Ser. No. 761,427, Aug. 1, 1985, Pat. No. 4,671,729.

[51] Int. Cl.⁴ .......... B60P 3/06; B60P 7/06

[52] U.S. Cl. .......... 410/3; 188/32; 410/67; 414/462; 414/921

[58] Field of Search .......... 414/341, 462, 537, 546, 414/921; 410/3, 6, 19, 30, 48, 62, 49, 66, 67; 187/8.52; 280/402; 188/32; 211/22

[56] References Cited

U.S. PATENT DOCUMENTS

| | | | |
|---|---|---|---|
| Re. 31,178 | 3/1983 | Deacon | 414/546 |
| 3,025,985 | 3/1962 | Crawford | 410/3 X |
| 3,362,547 | 1/1968 | Kovarik . | |
| 3,713,515 | 1/1973 | Hott | 187/8.52 X |
| 3,843,001 | 10/1974 | Willis | 414/462 |
| 4,029,223 | 6/1977 | Adamski et al. . | |
| 4,032,167 | 6/1977 | Chereda . | |
| 4,058,228 | 11/1977 | Hall . | |
| 4,073,395 | 2/1978 | Clement | 414/462 |
| 4,213,729 | 7/1980 | Cowles et al. | 414/462 |
| 4,407,624 | 10/1983 | Kingston | 414/546 |
| 4,456,421 | 6/1984 | Robson | 414/546 |
| 4,475,762 | 10/1984 | DeLong et al. | 410/19 |
| 4,514,132 | 4/1985 | Law et al. | 414/537 |
| 4,520,893 | 6/1985 | Keough | 410/4 X |
| 4,573,854 | 3/1986 | McFarland | 414/462 |
| 4,705,448 | 11/1987 | Mungons | 414/462 |

FOREIGN PATENT DOCUMENTS

| | | | |
|---|---|---|---|
| 2429690 | 2/1980 | France | 414/554 |
| 897582 | 5/1962 | United Kingdom | 188/32 |

OTHER PUBLICATIONS

Brochure of Ricon Sales, Inc., entitled "Ricon R30A Wheelchair Lift".

*Primary Examiner*—Leslie J. Paperner

*Attorney, Agent, or Firm*—Laney, Dougherty, Hessin & Beavers

[57] ABSTRACT

An apparatus for loading a scooter-type wheelchair or similar object into a vehicle comparment such that the apparatus and wheelchair loaded are fully contained within the vehicle when in a storage position. The apparatus includes a frame attachable to a lower surface of the vehicle compartment and a platform upon which the wheelchair may be rolled. During a loading cycle, the platform and wheelchair are raised upwardly, traversed toward the vehicle compartment and lowered into the compartment for storage. During this cycle, the platform passes through a vertical plane defining a maximum elevation. The platform includes wheel locators and positioning plates for locating the wheels of the wheelchair as it is positioned on the platform and for preventing the wheelchair from undesired movement once loaded. A vertical shaft is positioned adjacent a track portion of the platform. A horizontal shaft is pivotally attached to the vertical shaft, and a positioning plate for receiving a forward wheel of the wheelchair is pivotally attached to the horizontal shaft such that it has a tilted loading position and a substantially horizontal loaded position.

16 Claims, 4 Drawing Sheets

WHEELCHAIR LOADING APPARATUS

This is a division of application Ser. No. 761,427 filed Aug. 1, 1985 now U.S. Pat. No. 4,671,729.

BACKGROUND OF THE INVENTION

1. Field of the Invention

This invention relates to apparatus for loading wheelchairs, particularly of the scooter type, or similar objects into a vehicle, and more particularly, to an apparatus having a storage position fully contained within the vehicle.

2. Description of the Prior Art

In the prior art, numerous methods are utilized for loading scooter-type wheelchairs into a vehicle. One such device utilizes a cantilevered hoist-like device which extends rearwardly from the trunk of a car, and has a cable extending downwardly therefrom for attachment to the wheelchair. Such devices can be power-operated so that the cable is pulled upwardly. When raised to a sufficient height, the cantilevered arm is pivoted toward the trunk and the arm and wheelchair are lowered into the trunk. Such a device takes a certain degree of strength to operate, and thus is not suitable for many handicapped persons to manage alone.

A wheelchair loading apparatus which uses a pair of pivoted arms is disclosed in U.S. Pat. No. Re. 31,178 to Deacon. In this apparatus, a platform upon which a wheelchair may be loaded, with an occupant still in place thereon, is adapted to load through the rear or side opening of a van or similar vehicle. The device raises the platform level to the van floor, so that the occupant may then roll the wheelchair into the vehicle. The loading apparatus then collapses so that the doors of the vehicle may be closed. This is distinguishable from the present invention which raises a wheelchair up and passes through a vertical plane defining a maximum height and then lowers the chair to a storage position within the vehicle.

Another apparatus which uses a pair of arms to raise a platform level with the floor of a vehicle is shown in U.S. Pat. No. 4,456,421 to Robson. However, in Robson, the wheelchair must be rotated 90° to be stored. This is unacceptable for scooter-type wheelchairs.

None of the prior art discloses an apparatus by which a wheelchair may be lifted, traversed toward a compartment in the vehicle and then lowered to a storage position within the compartment while maintaining the apparatus in a horizontal plane.

SUMMARY OF THE INVENTION

The wheelchair loading apparatus of the present invention comprises a frame adapted for attachment to a vehicle, a platform for holding a wheeled object such as a scooter-type wheelchair and having a loading position adjacent the vehicle along a ground surface and further having a storage position within the vehicle, and linkage means pivotally connected to the frame and platform, whereby during a loading cycle, the platform and wheeled object loaded thereon are raised from the loading position, traversed toward the vehicle, crossing a vertical plane defining a maximum elevation, and then lowered to the storage position, all while maintaining the platform in a horizontal position. The raising, traversing and lowering movements are accomplished as a substantially continuous motion of the linkage means. The cycle is reversible for unloading.

The linkage means comprises an upper link having a frame end pivotally connected to the frame and a platform end pivotally connected to the platform and a lower link vertically and horizontally spaced from the upper link and having a frame end pivotally connected to the frame at a position below the frame end of the upper link and a platform end pivotally connected to the platform at a position below the platform end of the upper link. The links rotate through an angle greater than 180° during a loading cycle.

A drive shaft is connected to the frame end of one link such that the link is rotatable by turning the shaft, as by a motor. Another drive shaft is attached to the frame end of the other link, and transmission means operatively interconnecting the link drive shafts is utilized such that both links are rotatable concurrently.

Control switching means is used to start and stop a reversing motor for a loading or unloading cycle, and at least one limit switch is used to automatically stop the motor when the platform reaches the loading position during an unloading cycle or the storage position during a loading cycle. Counterbalance means in the form of at least one torsion spring is utilized to counterbalance the platform to reduce the power required to move the loaded platform during a loading or unloading cycle. The counterbalance spring helps eliminate looseness and vibration, thus providing positive control and predictable movement during a loading or unloading cycle.

An important object of the present invention is to provide an apparatus for loading a wheeled object into a vehicle, said apparatus being totally enclosed within the vehicle when in a storage position.

Another object of the invention is to provide a loading device for a wheelchair utilizing linkage means whereby the wheelchair may be raised, traversed toward the vehicle, crossing a vertical plane defining a maximum elevation, and lowered to a storage position, all while keeping the wheelchair horizontally oriented.

A further object of the invention is to provide an apparatus for loading a scooter-type wheelchair into the rear trunk compartment of a passenger automobile, such that the wheelchair may be raised up and over the sill of the trunk and lowered into the trunk.

An additional object is to provide a wheelchair loading apparatus having smooth operation during loading and unloading cycles.

Still another object of the invention is to provide a wheelchair loading apparatus utilizing a pair of spaced links, one of the links having a drive shaft driven by a motor, and having transmission means interconnecting the links so that both links are concurrently rotated.

Additional objects and advantages of the invention will become apparent as the following detailed description of the preferred embodiments is read in conjunction with the accompanying drawings which illustrate such preferred embodiments.

DETAILED DESCRIPTION OF THE PREFERRED EMBODIMENT

Figure 1:
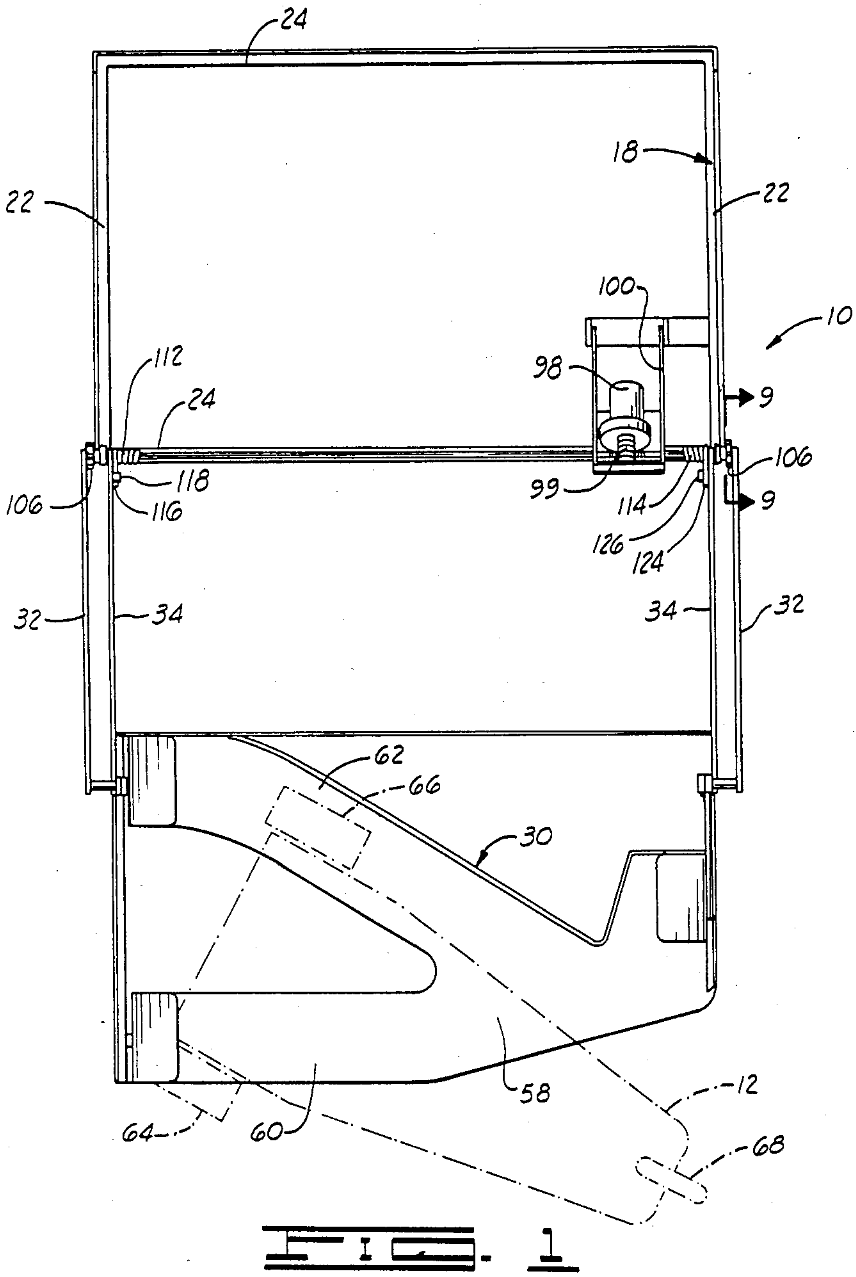
FIG. 1 shows a plan view of the wheelchair loading apparatus of the present invention, with a scooter-type wheelchair partially positioned thereon.

Referring now to the drawings, and more particularly to FIGS. 1-6, the wheelchair loading apparatus of the present invention is shown and generally designated by the numeral 10. The apparatus is designed for loading a scooter-type wheelchair 12 into a trunk 14 of a passenger automobile 16 or similar vehicle.

A frame 18 is adapted for mounting to a lower surface 20 of trunk 14. Frame 18 includes a pair of longitudinal members 22 and a pair of transverse members 24. Frame 18 also includes a pair of vertical members 26 at the rearwardmost portion of the frame and a pair of angularly disposed brace members 28.

A chair loading platform 30 is connected to frame 18 by linkage means in the form of a pair of upper links 32 and a corresponding pair of lower links 34.

Figure 4:
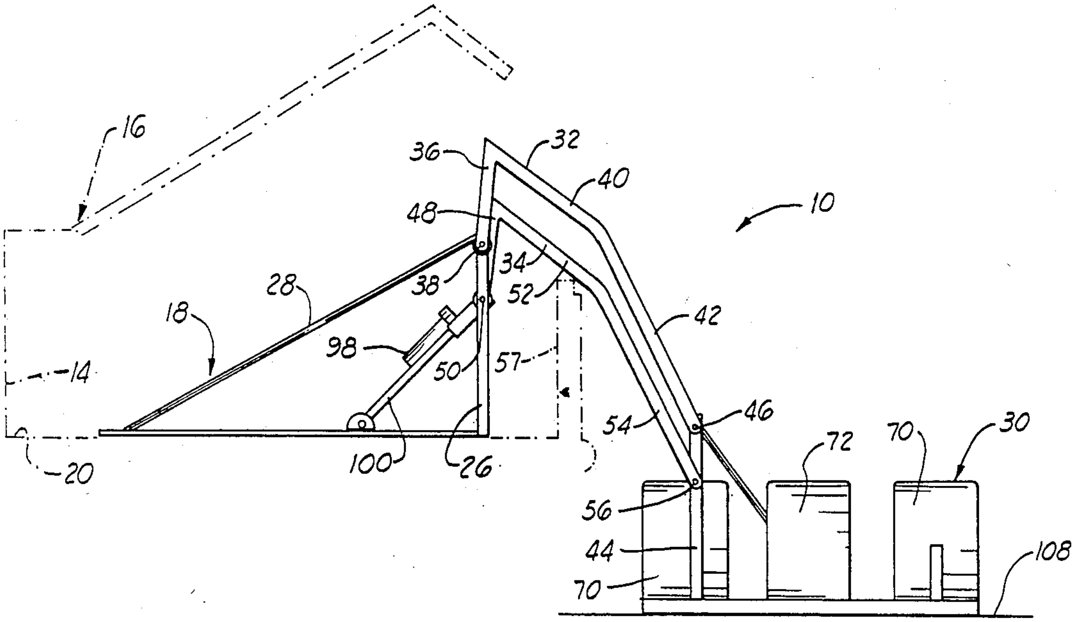
FIG. 4 illustrates a side elevation of an embodiment of the apparatus designed for loading into the trunk of a passenger automobile, the apparatus being in a loading or unloading position.

Each upper link 32 includes a frame end portion 36 pivotally connected to frame 18 at pivot point 38 and extending substantially upwardly when in the loading or unloading position of FIG. 4, an intermediate portion 40 extending rearwardly from the frame end portion at an acute angle with respect thereto, and a platform end portion 42 pivotally connected to vertical member 44 of platform 30 at pivot point 46. Lower link 34 has a corresponding frame end portion 48 pivotally connected to frame 18 at point 50, an intermediate portion 52, and a platform end portion 54 pivotally connected to vertical member 44 at point 56. This geometric configuration of links 32 and 34 provides clearance for sill 57 of trunk 14, and further facilitates a compact storage position within the trunk. Each link preferably has a substantially rectangular cross section.

Figure 2:
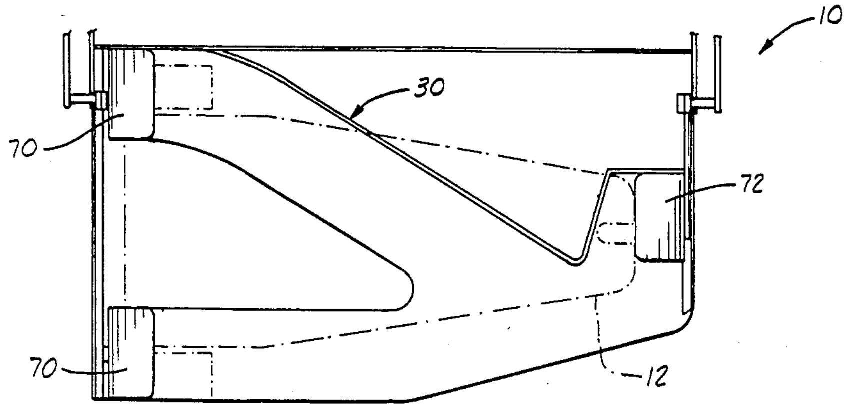
FIG. 2 shows a partial plan elevation with the wheelchair fully positioned thereon.

As shown in FIGS. 1 and 2, platform 30 comprises a substantially V-shaped track section 58 having a rearward leg 60 substantially perpendicular to a longitudinal axis of vehicle 16, and an angularly disposed forward leg 62. As shown in FIG. 1, a scooter-type wheelchair may be backed onto track section 58 such that the right rear wheel 64 travels along rearward leg 60 and the left rear wheel 66 travels on forward leg 62. By appropriate turning of front wheel 68, wheelchair 12 can be maneuvered into the loading position shown in FIG. 2 in which the wheelchair is substantially perpendicular to the longitudinal axis of the vehicle.

It should be noted that the apparatus is described herein for scooter-type wheelchairs having three wheels, but could easily be modified by those skilled in the art to be adapted for other configurations, such as a four-wheeled chair.

Figure 3:
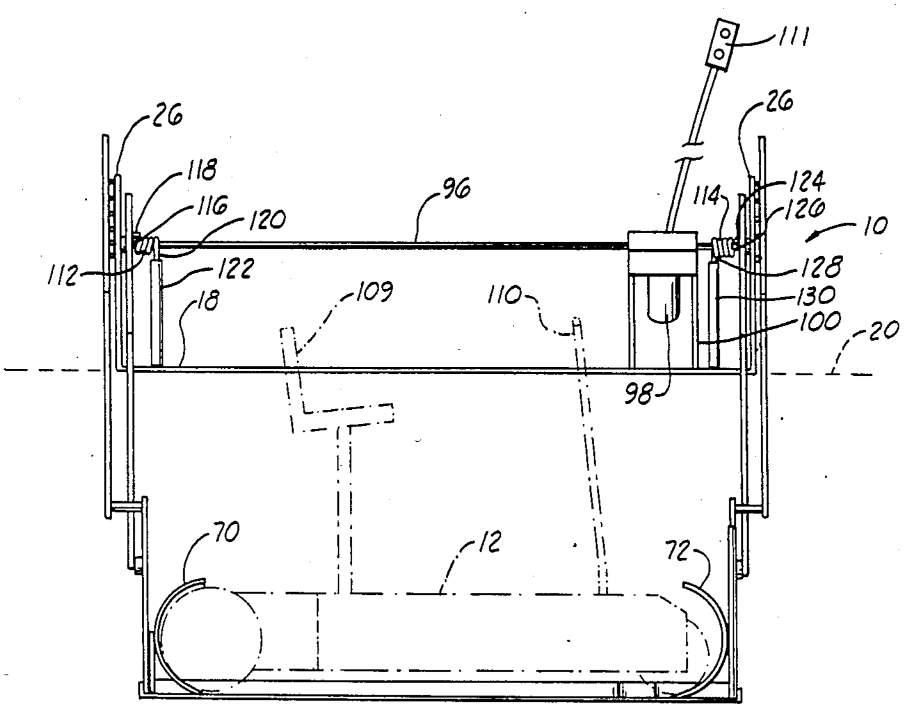
FIG. 3 is a transverse rear elevation view of the wheelchair loading apparatus with a scooter-type wheelchair positioned thereon.

Looking at FIG. 3, it can be seen that wheel location means are included in platform 30 in the form of a pair of upwardly extending curvilinear plates 70 concave toward, and dimensioned to fit, a circumferential surface of rear wheels 64 and 66, and a similar upwardly extending curvilinear plate 72 for front wheel 68. Thus, once wheelchair 12 is maneuvered into its loading position, it cannot roll in a transverse direction with respect to vehicle 16.

Figure 7:
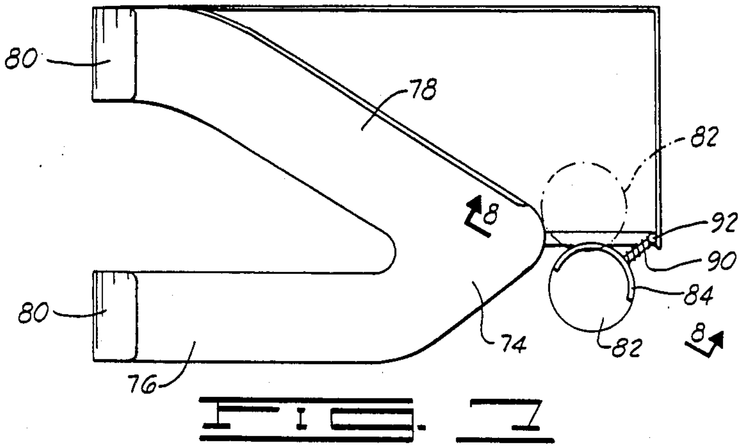
FIG. 7 illustrates a plan view of an alternate embodiment of the loading platform having pivotal front wheel locating means.
Figure 8:
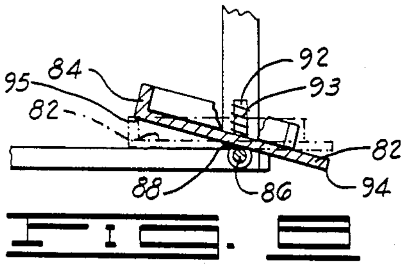
FIG. 8 is a cross section taken along line 8—8 in FIG. 7.

Referring now to FIGS. 7 and 8, an alternate embodiment of the front wheel location means of the platform is shown. The platform has a substantially V-shaped track section 74 with a transverse rearward leg 76 and an angularly disposed forward leg 78 similar to the first embodiment. Upwardly extending curvilinear plates 80 are positioned and dimensioned to correspond to the rearward wheels of the wheelchair, also as in the previously described embodiment. In the alternate embodiment, however, the front wheel of the wheelchair is rolled onto positioning plate 82 having a tilted loading or unloading position. Positioning plate 82 includes an upwardly extending restraining wall 84 which prevents the wheel from rolling off the positioning plate. Positioning plate 82 is pivotally attached to a horizontally disposed shaft 86. The tilted loading or unloading position of positioning plate 82 is shown in FIGS. 7 and 8 and with a loaded position of the positioning plate is shown in phantom lines. A pivotation stop 88 prevents overrotation of positioning plate 82 such that the loaded position is substantially horizontal. A torsion spring 90 biases positioning plate 82 towards its tilted loading or unloading position.

Horizontal shaft 86, and thus positioning plate 82, are also pivoted about a vertical shaft 92. Another torsion spring 93 biases positioning plate 82 in a counterclockwise direction, as viewed in FIG. 7, toward the loading or unloading position. It will be noted that shaft 86 is positioned off center with respect to positioning plate 82. That is, shaft 86 is closer to point 94 of positioning plate 82 which touches the ground than an opposite point 95, as seen most clearly in FIG. 8. Thus, as the front wheel of the wheelchair rolls onto the plate, it will rotate to the horizontal loaded position. As the vehicle is further moved on track 74, the front wheel will contact restraining plate 84 and force positioning plate 82 to pivot in a clockwise direction to the loaded position. This alternate embodiment is particularly adaptable to those wheelchairs which have relatively little freedom of movement of the front wheel thereof, and are thus less maneuverable.

Referring again to FIG. 3, lower links 34 are interconnected by a drive shaft 96. A reversible electric motor 98 powers drive shaft 96 through a right angle worm gear train 99. Links 34 are fixedly attached to drive shaft 96 such that, as motor 98 rotates the drive shaft, links 34 are rotated therewith. Motor 98 is attached to frame 18 at an angle with respect thereto by a bracket 100. This angled position of motor 98, and the use of worm gear train 99, represent a preferred embodiment which provides adequate clearance of the motor by platform 30 when it is positioned in trunk 14. However, it will be obvious to those skilled in the art, that other drive arrangements could also be utilized.

For example, but not by way of limitation, motor 98 could power drive shaft 96 through a chain and sprocket drive system.

Figure 9:
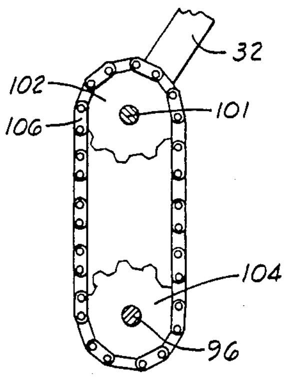
FIG. 9 is a cross-sectional view of the transmission means interconnecting link drive shafts, taken along lines 9—9 in FIG. 1.

Referring now to FIG. 9, each upper link 32 has an individual drive shaft 101 fixedly attached thereto. Fixed to each shaft 101 is an upper sprocket 102 which is positioned above a corresponding lower sprocket 104 attached to each end of lower link drive shaft 96. A chain 106 interconnects each set of sprockets 102 and 104. Thus, as drive shaft 96 is rotated by motor 98 to rotate lower links 34, power is transmitted from sprockets 104 to sprockets 102 for rotating drive shafts 101 and upper links 32 concurrently with the lower links. Sprockets 102 and 104 and chain 106 are positioned between corresponding horizontally spaced upper links 32 and lower links 34.

Figure 5:
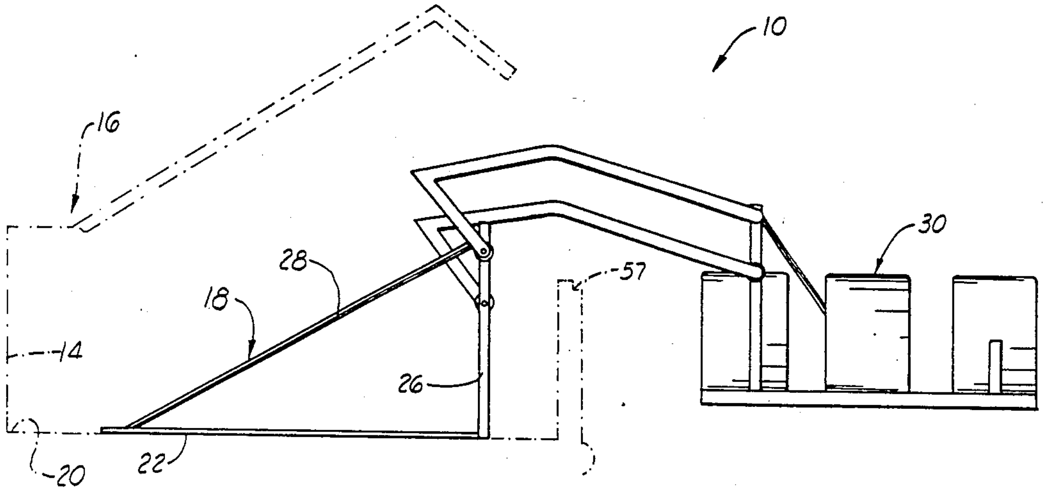
FIG. 5 is a side elevation view of the apparatus shown in FIG. 4 in an intermediate position during a loading or unloading cycle.
Figure 6:
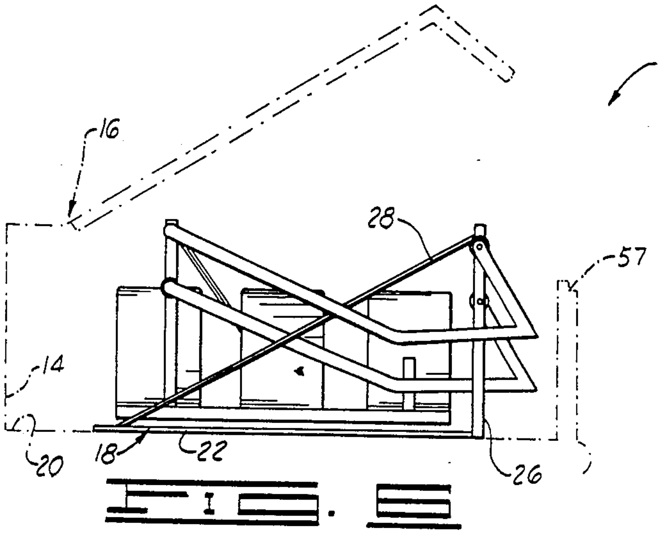
FIG. 6 is a side elevation view of the apparatus shown in FIGS. 4 and 5 when in a stored position within the trunk of an automobile.

Referring now to FIGS. 3–6, a loading, or unloading, cycle is illustrated. In the loading or unloading position illustrated in FIGS. 3 and 4, platform 30 is loacted adjacent ground surface 108, and wheelchair 12 may be positioned thereon as previously described. Seat 109 and steering control 110 are collapsed or removed as is appropriate for the particular model of wheelchair 12, and motor 98 is actuated by a remote control switch 111. As motor 98 rotates drive shaft 96 through gear train 99, links 32 and 34 are rotated as previously described such that platform 30 and wheelchair 12 positioned thereon are concurrently lifted and traversed toward trunk 14. An intermediate position of this cycle is illustrated in FIG. 5. It will be seen that as continued rotation of the links occurs, platform 30 will pass through a vertical plane defined by frame pivot points 38 and 50 at which point the platform reaches a maximum elevation, after which platform 30 is then lowered toward lower surface 20 of the trunk. Note that upper links 32 and lower links 34 must be horizontally spaced apart to accomplish this motion. When the apparatus finally reaches the storage position as shown in FIG. 6, the trunk lid may be closed on the trunk.

A study of FIGS. 4 and 6 will show that the links rotate more than 180° during a loading cycle. Also, pivot points 38 and 50 are preferably spaced apart at a distance substantially the same as pivot points 46 and 56 such that platform 30 is maintained in a substantially horizontal position throughout the loading cycle. Preferably, motor 98 is a reversing motor, so that it will be obvious to those skilled in the art that by reversing the rotation thereof, an unloading cycle may be effected.

Referring to FIGS. 1 and 3, torsion springs 112 and 114 are mounted at opposite ends of drive shaft 96. One pigtail end 116 of torsion spring 112 bears against pin 118 on one of links 34. An opposite pigtail end 120 extends downwardly and is inserted into hollow tube 122 attached to frame 18. Similarly, a first pigtail end 124 of spring 114 bears against pin 126 on the other link 34. Pigtail end 128 of spring 114 extends downwardly and fits inside hollow tube 130 attached to frame 18.

When the apparatus is in the loading position, torsion spring 112 is positioned to cause a torque tending to rotate links 32 and 34 from the loading position to the storage position. Similarly, when the apparatus is in the storage position, torsion spring 114 is positioned to cause a torque which tends to rotate links 32 and 34 from the storage position to the loading position. Thus, torsion springs 112 and 114 provide a means for counterbalancing the weight of platform 30 and chair 12 which reduces the power required by motor 98 to load the apparatus. At the start of a loading cycle, torsion spring 112 acts to reduce the power required by the motor. As the apparatus moves toward an intermediate position, the springs 112 and 114 tend to counteract one another. At the end of the loading cycle, spring 114 acts to reduce the load on the motor. It will be obvious to those skilled in the art that the springs function correspondingly during an unloading cycle.

Another advantage to this torsional spring biasing is that any play in the moving parts is removed so that the apparatus operates in a smooth and predictable manner during loading and unloading cycles. In other words, sudden movement of the apparatus is eliminated. This feature is extremely important when the apparatus is operated by persons having motor control or central nervous system disorders. It is a medical fact that surprise or shock to such handicapped persons can have severe results that would not occur with persons without such disorders. A common result is involuntary spasticity which can last for many minutes. Thus, smooth operation is extremely important for handicapped persons operating the apparatus.

Figure 10:
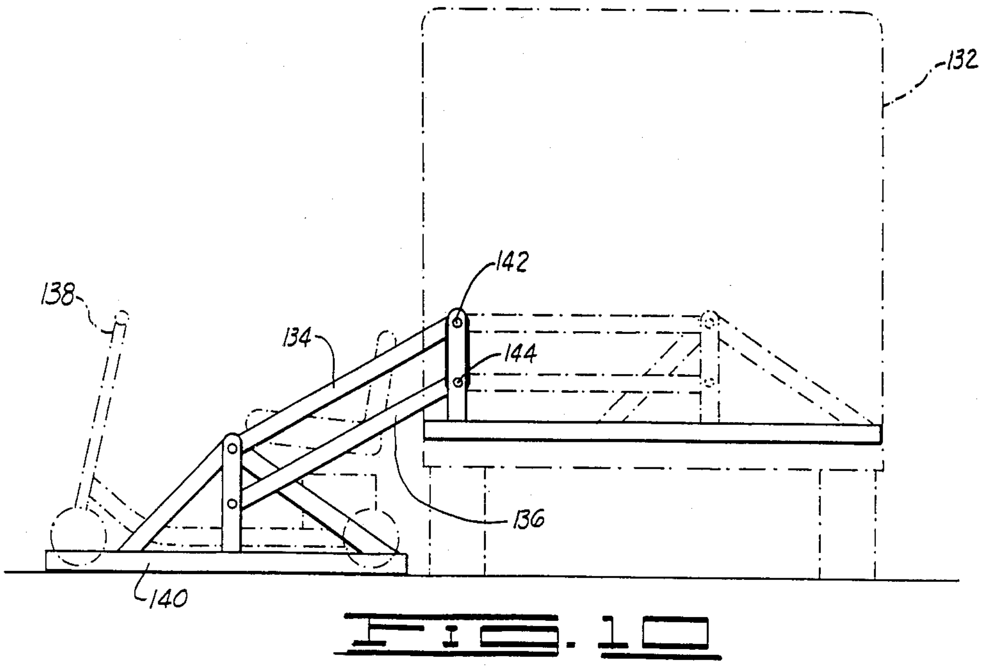
FIG. 10 shows a side elevation view of the apparatus in an embodiment designed for loading into the side opening of a van or similar vehicle.

An alternate embodiment of the apparatus is illustrated in FIG. 10 as being adapted to load into the side opening (or rear opening) of a van 132 or similar vehicle. Because there is no trunk sill to accommodate, the apparatus can utilize substantially straight upper links 134 and substantially straight lower links 136 parallel to the upper links. A wheelchair 138 may simply be rolled onto a substantially horizontal platform 140. Wheelchair 138 may be of the scooter-type illustrated, the conventional collapsible type, or any other configuration which is positionable on platform 140. After loading, the apparatus and chair may be lifted, traversed to the vehicle opening, and lowered into a storage position in a manner similar to the trunk mounted embodiment, as shown in the phantom lines of FIG. 10. Again, platform 140 and wheelchair 138 loaded thereon reach a maximum height as they pass through a vertical plane extending from frame pivot points 142 and 144. In those cases where there is adequate vertical clearance through the opening in van 132, the apparatus may also be utilized to load wheelchair 138 into the vehicle with a person still seated thereon.

It can be seen, therefore, that the wheelchair loading apparatus of the present invention is well adapted to carry out the objects and attain the ends and advantages mentioned, as well as those inherent therein. While presently preferred embodiments of the invention have been described for the purpose of this disclosure, numerous changes in the construction and arrangement of parts can be made by those skilled in the art. All such changes are encompassed within the scope and spirit of this invention as defined by the appended claims.

What is claimed is:

1. A loading platform for a scooter-type wheelchair comprising:

- a substantially horizontal track upon which rear wheels of said wheelchair may be rolled;
- a vertical shaft positioned adjacent said track;
- a horizontal shaft pivotally attached to said vertical shaft;
- a positioning plate for receiving a forward wheel of said wheelchair, said positioning plate pivotally attached to said horizontal shaft and having a tilted loading position and a substantially horizontal loaded position.

2. The platform of claim 1 further comprising:

a torsion spring attached to said horizontal shaft for biasing said positioning plate to said tilted loaded position; and a torsion spring attached to said vertical shaft for biasing said horizontal shaft.

3. The platform of claim 1 wherein said track is substantially V-shaped.

4. The platform of claim 1 further comprising a pivotation stop for preventing over-rotation of said positioning plate about said horizontal shaft.

5. The platform of claim 1 wherein said horizontal shaft is located off-center with respect to said positioning plate.

6. The platform of claim 1 further comprising a restraining wall on said positioning plate for preventing said forward wheel of said wheelchair from rolling off said positioning plate.

7. The platform of claim 1 further comprising a curvilinear plate extending upwardly from said track for locating a rear wheel of said wheelchair.

8. A loading platform for a scooter-type wheelchair comprising:

a substantially V-shaped track comprising:

a leg portion generally forming a side of said platform; and another leg portion extending angularly from the first-mentioned leg portion such that said wheelchair may be rolled onto said track from said side of said platform and located in a loading position thereon;

rear wheel location means for locating said rear wheels of said wheelchair in said loading position on said track; and front wheel location means for locating a front wheel of said wheelchair in said loading position on said track.

9. The platform of claim 8 wherein said front wheel location means is pivotable about a vertical axis.

10. The platform of claim 9 wherein said front wheel location means is further pivotable about a horizontal axis.

11. The platform of claim 8 wherein said rear wheel location means comprises a curvilinear plate extending upwardly from said track.

12. A loading platform for a scooter-type wheelchair comprising:

a substantially V-shaped track;

rear wheel location means for locating rear wheels of said wheelchair in a loading position on said track; and front wheel location means for locating a front wheel of said wheelchair in said loading position on said track, said front wheel location means being pivotable about a vertical axis and a horizontal axis and comprising:

a vertical shaft mounted on said track;

a horizontal shaft pivotally mounted on said vertical shaft; and a positioning plate pivotally mounted on said horizontal shaft.

13. The platform of claim 12 further comprising a pivotation stop for locating said positioning plate in a substantially horizontal loading position.

14. The platform of claim 12 further comprising a torsion spring for biasing said positioning plate towrad a tilted loading position.

15. The platform of claim 12 wherein said horizontal shaft is located closer to a point on said positioning plate touching a ground surface than an opposite point on said positioning plate when said positioning plate is in a tilted loaded position.

16. The platform of claim 12 further comprising a restraining wall on said positioning plate for preventing said front wheel of said wheelchair from rolling off said positioning plate.

* * * * *